No. 678,842. Patented July 16, 1901.
T. W. MORAN.
FLEXIBLE PIPE JOINT.
(Application filed Apr. 6, 1901.)

(No Model.) 2 Sheets—Sheet 1.

ATTEST:
Jos. Gregory
George W. Anderson

INVENTOR.
T. W. Moran,
E. W. Anderson
By his Atty.

THE NORRIS PETERS CO., PHOTO-LITHO., WASHINGTON, D. C.

No. 678,842. Patented July 16, 1901.
T. W. MORAN.
FLEXIBLE PIPE JOINT.
(Application filed Apr. 6, 1901.)

(No Model.) 2 Sheets—Sheet 2.

ATTEST. INVENTOR.
Jos Gregory T. W. Moran,
George M Anderson E.W. Anderson
By his Atty.

UNITED STATES PATENT OFFICE.

THOMAS WILLIAM MORAN, OF LOUISVILLE, KENTUCKY, ASSIGNOR TO MORAN FLEXIBLE STEAM JOINT COMPANY, OF SAME PLACE.

FLEXIBLE PIPE-JOINT.

SPECIFICATION forming part of Letters Patent No. 678,842, dated July 16, 1901.

Application filed April 6, 1901. Serial No. 54,689. (No model.)

*To all whom it may concern:*

Be it known that I, THOMAS WILLIAM MORAN, a citizen of the United States, and a resident of Louisville, in the county of Jefferson and State of Kentucky, have made a certain new and useful Invention in Flexible Pipe-Joints; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1:
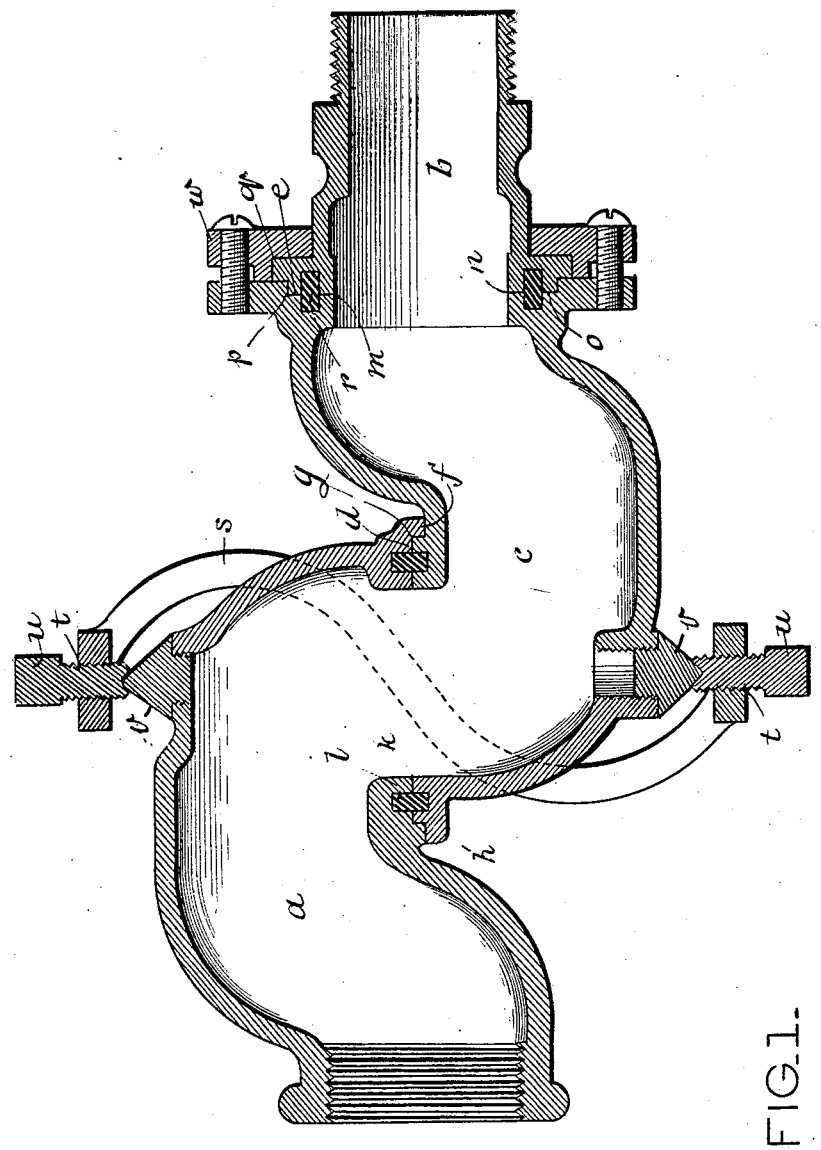
Figure 2:
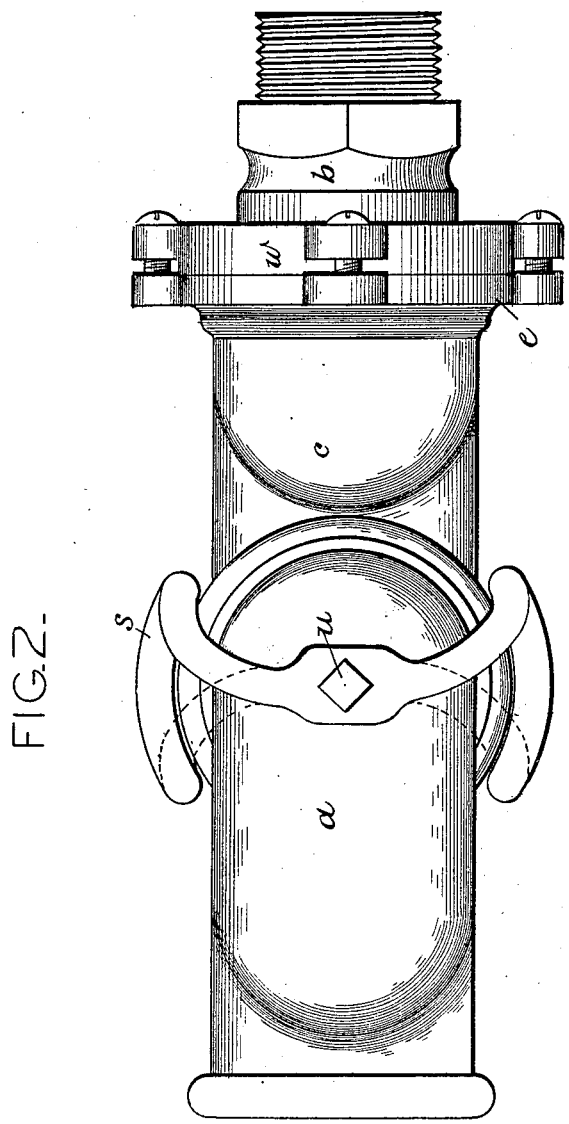

Figure 1 is a section on the line $xx$, Fig. 2. Fig. 2 is a plan view of my joint.

The invention relates to pivot-joints for pipe; and it consists in the novel construction and combinations of parts, as hereinafter set forth.

The object of the invention is to provide a hollow pipe-joint for suction purposes in which the friction of rotation is lessened and the passage-way through the joint is unobstructed, being as free in the joint as it is in the pipe-sections connected thereto.

In the accompanying drawings, illustrating this invention, the letter $a$ designates one of the ends or threaded attachment portions of the joint, and $b$ the other end or threaded attachment portion, the parts being usually constructed so as to bring the circular openings of these ends in the same axial line. The part $c$ is between the parts $a$ and $b$ and is connected to the part $a$ in such a manner as to have horizontal motion of rotation with reference thereto, while it is connected to the part $b$ in such a manner as to have motion of rotation in regard thereto in the vertical plane, or the position may be reversed, the object being to provide by means of the joint-section $c$ for two motions of rotation, one at right angles to the other. The joint section or part $c$, therefore, is provided with a circular flange-lip $d$ in the horizontal plane at one end and with a circular flange-lip $e$ in the vertical plane at its other end.

The lip $d$ is formed with an annular contact-face $f$, which is provided with an annular rib or bead $g$, designed to engage an annular groove $h$ of the contact-face $k$ of the end section $a$, and the faces $f$ and $k$ have each an annular groove formed therein to provide an annular chamber or seat and brace for a gasket $l$, of rubber, leather, or other suitable material, the inner walls of such grooves bracing such gasket against suction to prevent buckling thereof. The inner peripheral face of the gasket under suction closes the crevice or joint between the contact-faces of the joint-sections. At the other end of the middle section $c$ the lip $e$ is formed with an annular contact-face $m$, which is designed to be applied to the annular contact-face $n$ of the lip $o$ of the end section $b$. These contact-faces are respectively provided with annular engagement beads or shoulders, as indicated at $p$ and $q$, and an inside annular recess is provided by annular grooves of the two faces to receive a gasket or packing-ring $r$, which under suction when the joint is in use will close the crevice between such joint-sections.

The joint-sections $a$ and $c$ are curved and are connected by means of a yoke $s$, which is wide enough to span the flanges. This yoke is provided with threaded openings $t$ at its ends to receive the pivot-screws $u$, which are recessed, preferably, to engage the pointed socket screws or studs $v$ in the convexities of the joint-sections, said studs being located opposite each other in the axial line of the circular contact-faces $f$ and $k$.

The section $b$ is usually connected to the other end of the section $c$ by means of a flange yoke or plate $w$, which is secured to the flange-lip of section $c$ by means of short bolts and in such a manner as to engage the flange-lip of section $b$ closely, while allowing motion of rotation.

This joint is designed to have a very easy movement and is nevertheless close because of the manner in which the gaskets act to close the joints of the contact-faces.

When the three sections are used connected as shown, there is freedom of vertical as well as of horizontal rotation. When used in the form of a single joint, the section $b$ may be dispensed with, the end of section $c$ being threaded or flanged instead for attachment to a pipe-section.

Having described this invention, what I claim, and desire to secure by Letters Patent, is—

1. A hollow pivot pipe-joint for suction purposes, consisting of two sections engaging each other by annular grooved contact-faces, forming an annular bracing-gasket seat, the gasket seated therein, and the yoke having an outside pivotal connection with said sections, substantially as specified.

2. In a pipe-joint, the combination with the middle section having its grooved contact-faces at right angles to each other, of the end section having its grooved contact-face applied to one contact-face of the middle section to form an interiorly-braced gasket-seat, and the other end section having its grooved contact-face applied to the other contact-face of the middle section to form an interiorly-braced gasket-seat, the gaskets in such seats and the yoke connections, whereby the sections are pivoted together, substantially as specified.

3. In a pipe-joint, the two sections having the contact-faces provided with a gasket, and a detachable yoke connection embracing both said sections, substantially as specified.

4. In a pipe-joint, the two sections having the contacting faces provided with a gasket-seat, a gasket in such seat spanning the joint between such sections, and the yoke, having cone outer pivotal connections with said sections, substantially as specified.

5. In a pipe-joint, the two pipe-sections, and the yoke connection for said sections, the opening of which receives said sections, and the pivot-screws carried by said yoke at opposite ends thereof, substantially as specified.

In testimony whereof I affix my signature in presence of two witnesses.

THOMAS WILLIAM MORAN.

Witnesses:
E. E. SUTTON,
F. H. FENWOOD.